US012614528B2

(12) United States Patent
Kuo

(10) Patent No.: US 12,614,528 B2
(45) Date of Patent: Apr. 28, 2026

(54) METHOD AND DEVICE FOR REDUCING OVERSHOOT USING PERCEPTUAL QUANTIZER

(71) Applicant: QISDA CORPORATION, Taoyuan City (TW)

(72) Inventor: Min-An Kuo, Hsinchu City (TW)

(73) Assignee: QISDA CORPORATION, Taoyuan City (TW)

( * ) Notice: Subject to any disclaimer, the term of this patent is extended or adjusted under 35 U.S.C. 154(b) by 0 days.

(21) Appl. No.: 19/019,514

(22) Filed: Jan. 14, 2025

(65) Prior Publication Data

US 2025/0391386 A1 Dec. 25, 2025

(30) Foreign Application Priority Data

Jun. 21, 2024 (CN) ......................... 202410810006.9

(51) Int. Cl.
*G09G 3/36* (2006.01)

(52) U.S. Cl.
CPC ... *G09G 3/3607* (2013.01); *G09G 2320/0252* (2013.01); *G09G 2320/0271* (2013.01); *G09G 2320/0285* (2013.01); *G09G 2320/0626* (2013.01); *G09G 2360/16* (2013.01)

(58) Field of Classification Search
CPC ......... G09G 3/3607; G09G 2320/0252; G09G 2320/0271; G09G 2320/0285; G09G 2320/0626; G09G 2360/16
See application file for complete search history.

(56) References Cited

U.S. PATENT DOCUMENTS

| | | | | |
|---|---|---|---|---|
| 2005/0276502 A1* | 12/2005 | Brown Elliott | H04N 9/69 | 382/254 |
| 2014/0347384 A1* | 11/2014 | Kwak | G09G 3/3648 | 345/601 |
| 2018/0338104 A1* | 11/2018 | Pines | H04N 21/44 | |
| 2021/0201852 A1* | 7/2021 | Lee | G09G 5/10 | |
| 2021/0398503 A1* | 12/2021 | Hori | G09G 5/02 | |

OTHER PUBLICATIONS

MovieLabs Best Practices for Mapping BT.2100 PQ to HLG Using maxRGB, Jun. 2021, Motion Picture Laboratories, Inc. (Year: 2021).*

Kunkel et al., The Perceptual Quantizer Design Considerations and Applications, Mar. 15, 2022, Dolby. (Year: 2022).*

* cited by examiner

*Primary Examiner* — David Tung
(74) *Attorney, Agent, or Firm* — Winston Hsu

(57) ABSTRACT

A method for driving a display based on a perceptual quantizer includes establishing a relationship among an initial grayscale level, a desired grayscale level and a target grayscale value, confirming an actual target grayscale value to convert a pixel in the display from the initial grayscale level to the corresponding desired grayscale level based on the relationship, and using the actual target grayscale value to convert the pixel in the display from the initial grayscale level to the corresponding desired grayscale level. The target grayscale value is used to accelerate the conversion of the initial grayscale level to the corresponding desired grayscale level. The target grayscale value is established based on the initial grayscale level, the desired grayscale level and a visible area.

14 Claims, 5 Drawing Sheets

METHOD AND DEVICE FOR REDUCING OVERSHOOT USING PERCEPTUAL QUANTIZER

BACKGROUND OF THE INVENTION

1. Field of the Invention

The present invention relates to the field of reducing display device overshoot, and in particular to a method and a display device based on perceptual quantizer to reduce the overshoot of a liquid crystal display.

2. Description of the Prior Art

Since the grayscale change of liquid crystal pixels requires time to react, liquid crystal displays (LCD) will have motion blur phenomenon when displaying dynamic images. Displays usually use overdrive (OD) or other motion blur reduction technologies to improve image quality.

FIG. 1 is a schematic diagram of the brightness change curve of the LCD screen in the prior art without overdrive and with overdrive. As shown in FIG. 1, without overdrive, it takes 7.5 ms for the LCD screen to switch from grayscale 64 to grayscale 128, and it takes about 7.5 ms for the brightness to rise from 10% to 90% between the two grayscales. When overdrive is applied, the target grayscale value is set to grayscale 138, so that the response time can be reduced, and the brightness rise time changes from the original 7.5 ms to 5.5 ms, which can greatly shorten the response time. However, using a grayscale 138 higher than the target as the target grayscale value will cause an overshoot phenomenon in the brightness change process, that is, the part that exceeds grayscale 128 in FIG. 1. As shown in the shadow part in FIG. 1, it can be seen that the overshoot phenomenon will cause a transient state that exceeds the desired grayscale level, forming an overshoot shadow area.

Therefore, it is necessary to design a new method and display device based on perceptual quantizer to reduce overshoot and improve the above defects. The new method shortens the reaction time to reduce overshoot shadow area and reduces the negative impact caused by overshoot, so as not to cause a human eye to perceive brightness changes.

SUMMARY OF THE INVENTION

An embodiment provides a method for driving a display based on a perceptual quantizer. The method includes establishing a relationship among an initial grayscale level, a desired grayscale level and a target grayscale value, confirming an actual target grayscale value to convert a pixel in the display from the initial grayscale level to the corresponding desired grayscale level based on the relationship, and using the actual target grayscale value to convert the pixel in the display from the initial grayscale level to the corresponding desired grayscale level. The target grayscale value is used to accelerate the conversion of the initial grayscale level to the corresponding desired grayscale level. The target grayscale value is established based on the initial grayscale level, the desired grayscale level and a visible area. The visible area is an area formed by a visible brightness difference of the perceptual quantizer and a visible reaction time on a coordinate system with time as a horizontal axis and brightness as a vertical axis. The visible brightness difference of the perceptual quantizer is a brightness change perceived by a human eye. The visible reaction time is a reaction time for the human eye to perceive the brightness change.

An embodiment provides a display device based on a perceptual quantizer. The display device includes a memory, a processor, and a liquid crystal display. The memory is used to store a relationship among an initial grayscale level, a desired grayscale level and a target grayscale value, wherein the target grayscale value is used to accelerate a conversion of the initial grayscale level to the corresponding desired grayscale level. The target grayscale value is established based on the initial grayscale level, the desired grayscale level and a visible area. The processor is coupled to the memory and used to confirm an actual target grayscale value to convert a pixel in the display from the initial grayscale level to the corresponding desired grayscale level according to the relationship, and utilize the actual target grayscale value to convert the pixel from the initial grayscale level to the corresponding desired grayscale level. The liquid crystal display is used to display an image, wherein a brightness of a pixel in the image is switched from the initial grayscale level to the desired grayscale level. The visible area is an area formed by a visible brightness difference of the perceptual quantizer and a visible reaction time on a coordinate system with time as a horizontal axis and brightness as a vertical axis. The visible brightness difference of the perceptual quantizer is a brightness change perceived by a human eye, and the visible reaction time is a reaction time for the human eye to perceive the brightness change.

These and other objectives of the present invention will no doubt become obvious to those of ordinary skill in the art after reading the following detailed description of the preferred embodiment that is illustrated in the various figures and drawings.

DETAILED DESCRIPTION

In order to provide a further understanding of the purpose, structure, features, and functions of the present invention, the following detailed description is given in conjunction with the embodiments.

Certain words are used in the specification and claims to refer to specific components. Those with ordinary knowledge in the field should understand that manufacturers may use different terms to refer to the same component. This specification and claims do not use differences in names as a way to distinguish components, but rather use differences in functions of components as the criteria for distinction. The terms "including" and "comprising" mentioned throughout the specification and claims is an open-ended term and should be interpreted as "including but not limited to".

Figure 2:
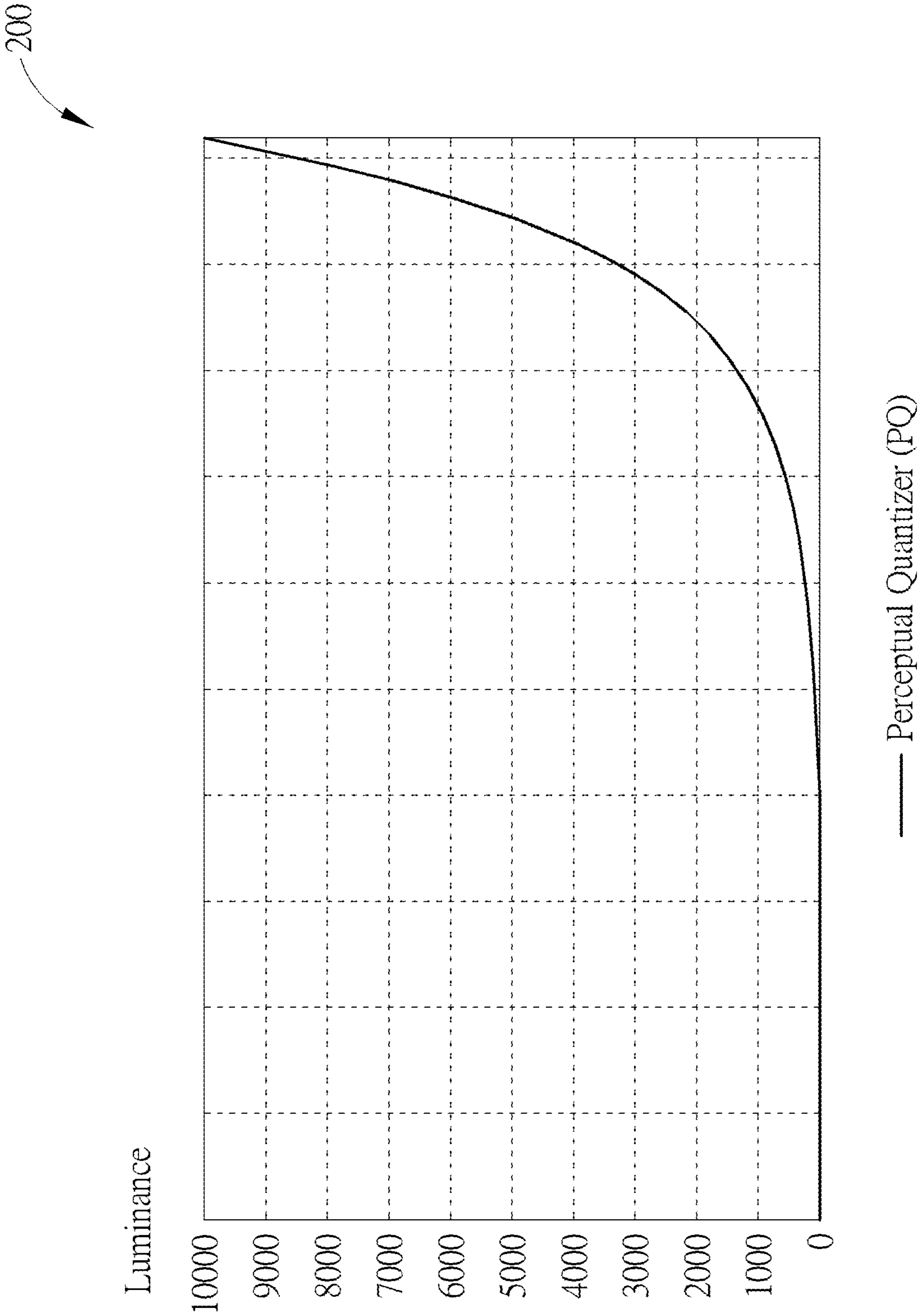
FIG. 2 is a graph of the relationship between perceptual quantizer (PQ) and brightness according to an embodiment of the present invention.

FIG. 2 is a graph 200 of the relationship between perceptual quantizer (PQ) and brightness according to an embodiment of the present invention. The relationship is a standardized perceptual quantizer (PQ) curve defined by Society of Motion Picture and Television Engineers (SMPTE), which is formulated based on the change in visible brightness of the human eye. As can be seen from FIG. 2, under low brightness conditions, the human eye is more sensitive to brightness changes, and only a slight change in brightness (Luminance) causes a significant change in perceptual quantization (PQ), so the human eye has a clear feeling. Under high brightness conditions, the human eye is less sensitive to brightness changes, and a large amount of brightness changes are required for PQ to change slightly, thus the human eye perceives a corresponding brightness difference. From this curve, it can be seen that the human eye's perception of light brightness is different under high brightness and low brightness conditions. The human eye is less sensitive at high brightness and more sensitive at low brightness. The present invention uses PQ to correct the overshoot phenomenon of liquid crystal display (LCD) conversion, and the sensitivity of the human eye using PQ is more accurate than using general brightness (Luminance).

Figure 1:
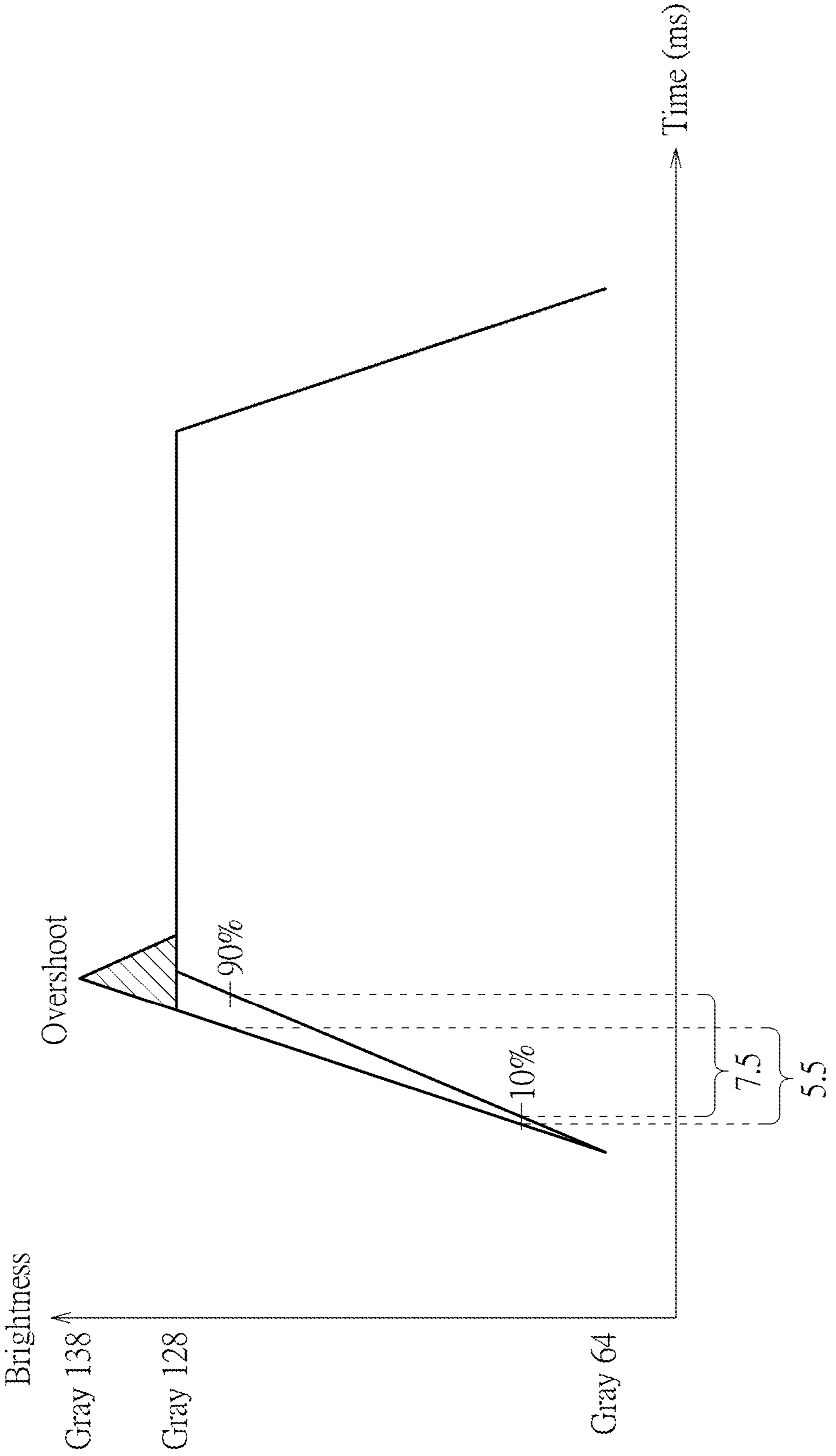
FIG. 1 is a schematic diagram of the brightness change curve of the LCD screen in the prior art without overdrive and with overdrive.
Figure 3:
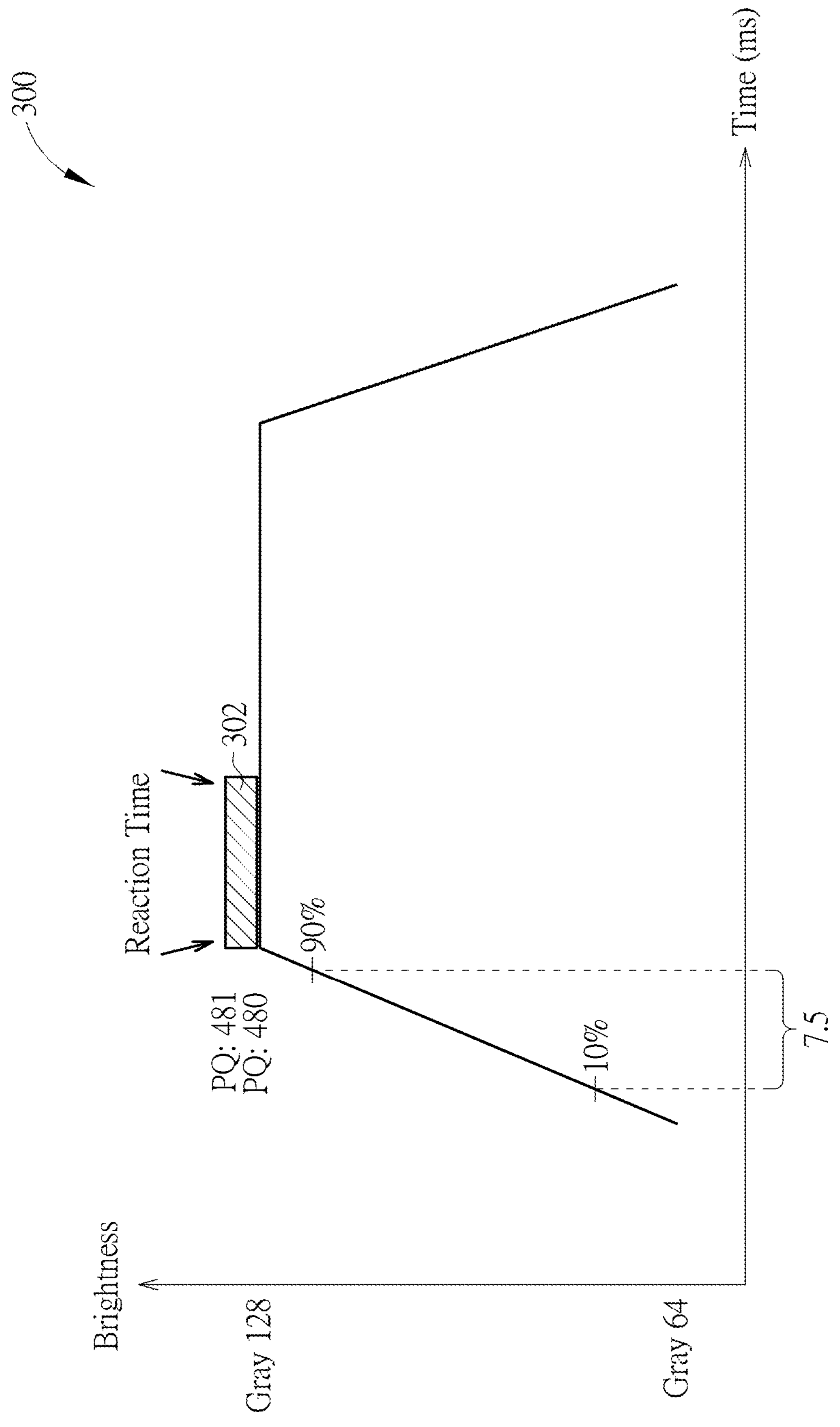
FIG. 3 is a schematic diagram of a visible area in a brightness change curve according to an embodiment of the present invention.

FIG. 3 is a schematic diagram of a visible area 302 in a brightness change curve 300 according to an embodiment of the present invention. The brightness change curve 300 in FIG. 3 rises from grayscale 64 to grayscale 128, maintains for a period of time, and then drops back to grayscale 64. In order to shorten the conversion time from grayscale 64 to grayscale 128, the target grayscale value can be set to grayscale 138 as shown in FIG. 1 to accelerate the process of brightness conversion. The visible area 302 shown in FIG. 3 is an area formed by a visible brightness difference of the perceptual quantizer and a visible reaction time on a coordinate system with time as a horizontal axis and brightness as a vertical axis. In other words, the visible area 302 is the product of the visible reaction time and the visible brightness difference of the perceptual quantizer. In FIG. 3, the desired grayscale level 128 corresponds to PQ=480, the target grayscale value 138 corresponds to PQ=481, and the visible brightness difference is the brightness difference from PQ=480 to PQ=481, which is exactly a difference unit that the human eye can perceive the brightness change. This visible area 302 can be used to limit the shadow area caused by the overshoot phenomenon in FIG. 1. In one embodiment, the shadow area caused by the overshoot phenomenon (the shadow area in FIG. 1) must be less than or equal to the visible area 302. By limiting the visible area 302, the target grayscale value can be adjusted to control the overshoot phenomenon. Thus, the liquid crystal display (LCD) flip can be accelerated to obtain the optimal balance point without causing the human eye to perceive brightness changes. In other embodiments, the visible brightness difference can also be a positive integer multiple of a difference unit of the visible brightness of the perceptual quantizer.

Figure 4:
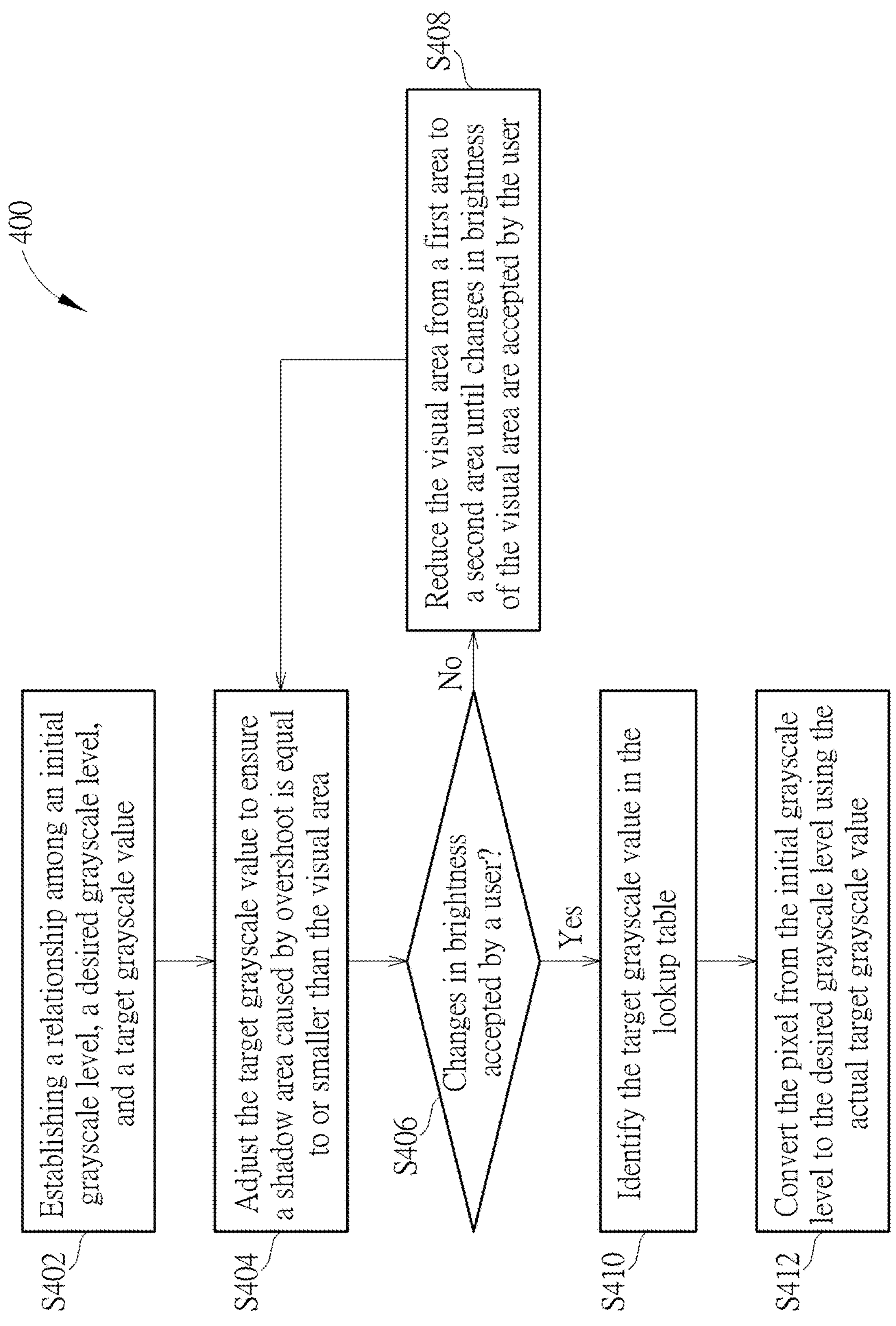
FIG. 4 is a flow chart of a method for reducing overshoot through perceptual quantizer (PQ) according to an embodiment of the present invention.

FIG. 4 is a flow chart of a method 400 for reducing overshoot through perceptual quantizer (PQ) according to an embodiment of the present invention. The method 400 includes the following steps:

Step S402: Establishing a relationship among an initial grayscale level, a desired grayscale level, and a target grayscale value (for example, obtaining the relationship through a function, a lookup table, etc., and the following embodiments of the present invention take a lookup table as an example);

Step S404: Adjust the target grayscale value to ensure a shadow area caused by overshoot is equal to or smaller than the visible area 302;

Step S406: Check whether the changes in brightness are accepted by a user; if so, go to step S410; otherwise, go to step S408;

Step S408: Reduce the visible area 302 from a first area to a second area until changes in brightness of the visible area 302 are accepted by the user; go to step S404;

Step S410: Identify the actual target grayscale value in the lookup table to convert a pixel in the display from the initial grayscale level to the desired grayscale level; and Step S412: Convert the pixel in the display from the initial grayscale level to the desired grayscale level using the actual target grayscale value.

Step S402 to step S408 complete the establishment and adjustment of the corresponding relationship (such as the lookup table), and step S410 to step S412 are applied to the overdrive adjustment in the actual display process based on the above corresponding relationship (such as the lookup table).

In step S402, a relationship among an initial grayscale level, a desired grayscale level, and a target grayscale value is established (i.e., a lookup table). The lookup table contains a plurality of target grayscale values for accelerating the conversion of pixels from a plurality of initial grayscale levels to a plurality of desired grayscale levels. The target grayscale values are established based on the initial grayscale levels, the desired grayscale levels, and the visible area. As shown in FIG. 3, the visible area is an area formed by a visible reaction time and a visual brightness difference of perceptual quantizer. A PQ difference unit of the visible brightness is used as the minimum unit in change of the visible area. The initial visible area may be a visible area corresponding to a 1 PQ difference unit of the visible brightness, so as to minimize the brightness change felt by the human eye. In other embodiments, the initial visible area may also be a visible area corresponding to a plurality of PQ difference units of the visible brightness (e.g., 10 PQ difference units of visible brightness). The initial visible area is larger, and the brightness change felt by the human eye will be more obvious. The setting of the visible area is also based on the desired grayscale level or the display frequency of the LCD screen.

In step S404, the target grayscale value of the lookup table is adjusted so that the overshoot shadow area is less than or equal to the visible area. Specifically, the initial value and visible area of the target grayscale value are obtained, and the overshoot shadow area corresponding to the initial value of the target grayscale value is obtained. If the overshoot shadow area is larger than the visible area, the target grayscale value is lowered so that the overshoot shadow area is equal to or less than the visible area. If the overshoot shadow area is equal to or less than the visible area, no adjustment is required. In a preferred embodiment, the target grayscale value can be lowered based on a fixed step, based on a positive integer multiple of a grayscale unit, such as a grayscale value unit. In other embodiments, the target grayscale value can also be lowered based on a variable step, such as first coarse adjustment with a large step and then fine adjustment with a small step. The present invention is not limited to this.

In step S406, it is checked whether the user can accept the visual brightness change of the visible area. If so, go to step S410; otherwise, go to step S408.

In step S408, the visible area is reduced until the user accepts the visual change in brightness of the visible area. The visible area can be reduced in steps based on a difference unit of the visible brightness of one PQ. In other embodiments, the visible area can also be reduced in steps based on, for example, a difference unit of the visible brightness of 2 PQ. Since the visible area is reduced, in order to make the shadow area caused by the overshoot less than or equal to the visible area, the target grayscale value will also be adjusted to be closer to the desired grayscale level, so as to achieve a visual change in brightness acceptable to the user. If there is still an unacceptable overshoot shadow area after adjusting the visible area, the visible area is continuously reduced until the shadow area is accepted by the user, and the target grayscale value of the lookup table is updated. For different desired grayscale levels, the visible area acceptable to the user varies, and adjustments are made in step S408 to update the lookup table.

In step S410, the corresponding actual target grayscale value is found in the lookup table, and in step S412, the brightness change of the pixel from the initial grayscale level to the desired grayscale level is displayed on the LCD screen, and the target used in the process is the actual target grayscale value. Since the visible area is reduced to the user's acceptable visual change range, the brightness change caused by the target grayscale value is also an acceptable change for the user, and the method 400 is used to achieve the reduction of overshoot through PQ.

Figure 5:
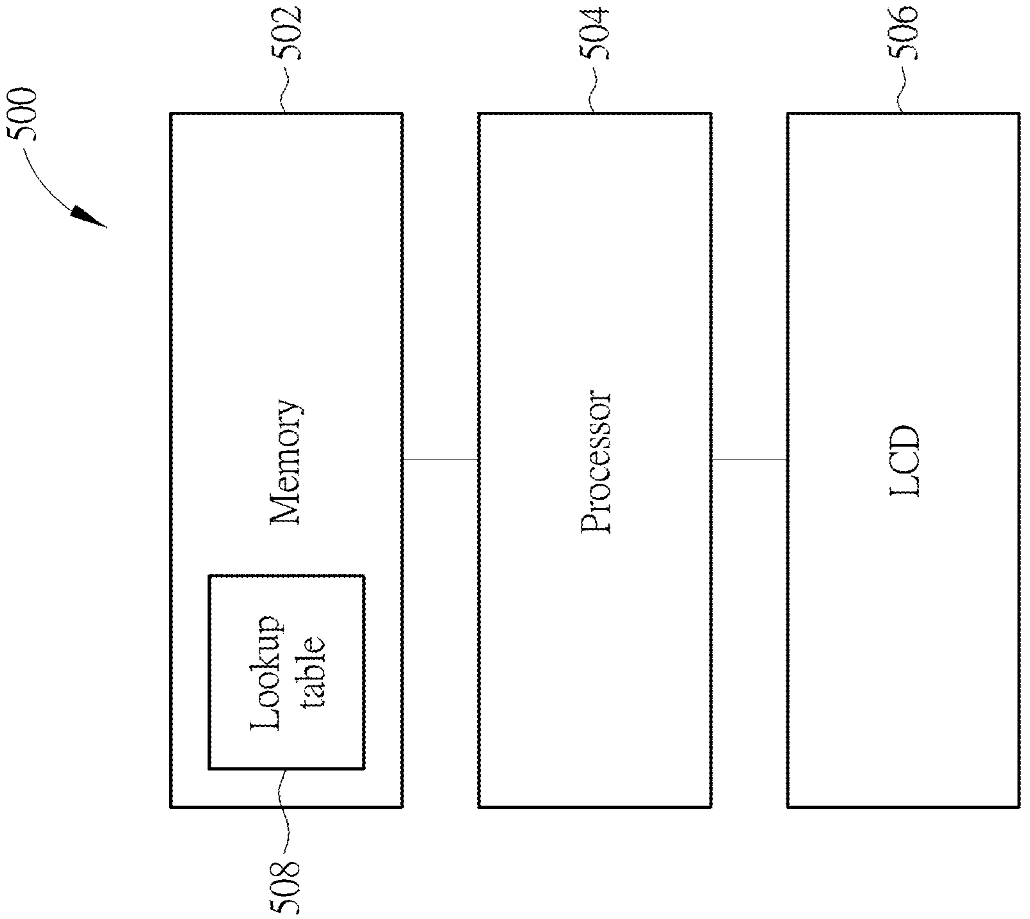
FIG. 5 is a block diagram of a display device using perceptual quantizer (PQ) to reduce overshoot according to an embodiment of the present invention.

FIG. 5 is a block diagram of a display device 500 using perceptual quantizer (PQ) to reduce overshoot according to an embodiment of the present invention.

The display device 500 includes a memory 502, a processor 504, and a liquid crystal display 506. The memory 502 stores the relationship among the initial grayscale level, the desired grayscale level, and the target grayscale value (for example, the relationship is obtained through a function, a lookup table, etc., and the lookup table 508 is taken as an example in the embodiment of the present invention). The lookup table 508 has a plurality of target grayscale values for accelerating the conversion of pixels from a plurality of initial grayscale levels to a plurality of desired grayscale levels. By using the target grayscale value as the conversion target, the process of converting the pixel of the liquid crystal display 506 from the initial grayscale level to the desired grayscale level can be shortened. The processor 504 is coupled to the memory 502, and is used to find out the actual target grayscale value used to convert a pixel in the display image from the initial grayscale level to the desired grayscale level from the lookup table 508, and use the actual target grayscale value to convert the pixel from the initial grayscale level to the desired grayscale level. The liquid crystal display 506 is used to display the brightness change from the initial grayscale level to the desired grayscale level. The target grayscale values included in the lookup table 508 are set according to the initial grayscale level, desired grayscale level and the visible area. The visible area is the area formed by the visible brightness difference of the perception quantizer (PQ) and the visible reaction time on the coordinate system with time as the horizontal axis and brightness as the vertical axis.

The adjustment step of the visible area is one difference unit of the visible brightness of the perception quantizer (1 PQ brightness difference). By checking whether the human eye can accept the visual brightness change of the visible area, the visible area is continuously reduced until the human eye can accept the brightness change, and then the target grayscale value is adjusted so that the shadow area caused by the overshoot phenomenon is less than or equal to the visible area. The pixels of the liquid crystal display 506 can control the overshoot phenomenon and obtain a better reaction time under an acceptable brightness change for the user during the conversion from the initial grayscale level to the desired grayscale level.

In summary, the present invention provides a method 400 for driving display using perceptual quantizer to reduce overshoot. Because PQ can represent the real visual response of the human eye, reducing the visible area and thus changing the target grayscale value can effectively reduce the shadow area caused by the overshoot phenomenon, thereby making the brightness change process of the pixels of the liquid crystal display 506 from the initial grayscale level to the desired grayscale level faster and reducing the overshoot phenomenon.

The present invention has been described by the above-mentioned relevant embodiments. However, the above-mentioned embodiments are only examples for implementing the present invention. It must be pointed out that the disclosed embodiments do not limit the scope of the present invention. On the contrary, changes and modifications made without departing from the spirit and scope of the present invention are all within the scope of patent protection of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for driving a display based on a perceptual quantizer, comprising:

establishing a relationship among an initial grayscale level, a desired grayscale level and a target grayscale value, wherein the target grayscale value is used to accelerate the conversion of the initial grayscale level to the corresponding desired grayscale level; the target grayscale value is established based on the initial grayscale level, the desired grayscale level and a visible area;

based on the relationship, confirming an actual target grayscale value to convert a pixel in the display from the initial grayscale level to the corresponding desired grayscale level; and using the actual target grayscale value to convert the pixel in the display from the initial grayscale level to the corresponding desired grayscale level;

wherein the visible area is an area formed by a visible brightness difference of the perceptual quantizer and a visible reaction time on a coordinate system with time as a horizontal axis and brightness as a vertical axis; the visible brightness difference of the perceptual quantizer is a brightness change perceived by a human eye, and the visible reaction time is a reaction time for the human eye to perceive the brightness change.

2. The method of claim 1, wherein the visible brightness difference of the perceptual quantizer is a positive integer multiple of a difference unit of the visible brightness of the perceptual quantizer.

3. The method of claim 1, wherein the target grayscale value is established according to the initial grayscale level, the desired grayscale level and the visible area, specifically comprising:

obtaining an initial value of the target grayscale value and the visible area;

obtaining an overshoot shadow area corresponding to the initial value of the target grayscale value;

if the overshoot shadow area is larger than the visible area, adjusting the target grayscale value so that the overshoot shadow area is equal to or smaller than the visible area.

4. The method of claim 3, wherein the visible area is set according to a visible change of brightness of the visible area being accepted by a user, the visible area is set based on a display frequency of the display, or the visible area is set based on the desired grayscale level.

5. The method of claim 4, further comprising:

reducing the visible area from a first area to a second area until the user accepts the visual change in brightness of the visible area.

6. The method of claim 3, further comprising:

when the overshoot shadow area is still not accepted by a user after adjusting the target grayscale value, reducing the visible area.

7. The method of claim 6, wherein the step of reducing the visible area is based on a visible brightness unit of the perceptual quantizer.

8. A display device based on a perceptual quantizer, comprising:

a memory, configured to store a relationship among an initial grayscale level, a desired grayscale level and a target grayscale value, wherein the target grayscale value is configured to accelerate a conversion of the initial grayscale level to the corresponding desired grayscale level; the target grayscale value is established based on the initial grayscale level, the desired grayscale level and a visible area;

a processor, coupled to the memory, and configured to confirm an actual target grayscale value to convert a pixel in the display from the initial grayscale level to the corresponding desired grayscale level according to the relationship, and use the actual target grayscale value to convert the pixel from the initial grayscale level to the corresponding desired grayscale level; and a liquid crystal display, configured to display an image, wherein a brightness of a pixel in the image is switched from the initial grayscale level to the desired grayscale level;

wherein, the visible area is an area formed by a visible brightness difference of the perceptual quantizer and a visible reaction time on a coordinate system with time as a horizontal axis and brightness as a vertical axis; the visible brightness difference of the perceptual quantizer is a brightness change perceived by a human eye, and the visible reaction time is a reaction time for the human eye to perceive the brightness change.

9. The display device of claim 8, wherein the visible brightness difference of the perceptual quantizer is a positive integer multiple of a difference unit of the visible brightness of the perceptual quantizer.

10. The display device of claim 8, wherein the processor also obtains an initial value of the target grayscale value and the visible area, and obtains an overshoot shadow area corresponding to the initial value of the target grayscale value; if the processor determines that the overshoot shadow area is larger than the visible area, the target grayscale value is adjusted so that the overshoot shadow area is equal to or smaller than the visible area.

11. The display device of claim 10, wherein the visible area is set according to a visual change of brightness of the visible area being accepted by a user, or the visible area is set based on the desired grayscale level, or the visible area is set based on a display frequency of the liquid crystal display.

12. The display device of claim 11, wherein the processor reduces the visible area from a first area to a second area until the user accepts the visual change in brightness of the visible area.

13. The display device of claim 11, wherein when the processor adjusts the target grayscale value and an overshoot shadow area is still not accepted by the user, the visible area is reduced.

14. The display device of claim 11, wherein the processor reduces the visible area based on a visible brightness unit of the perceptual quantizer.

* * * * *